United States Patent
Lai

(10) Patent No.: US 9,080,585 B2
(45) Date of Patent: Jul. 14, 2015

(54) COLLAPSIBLE TUBULAR ROD

(71) Applicant: Hsin-Yuan Lai, Taichung (TW)

(72) Inventor: Hsin-Yuan Lai, Taichung (TW)

( * ) Notice: Subject to any disclaimer, the term of this patent is extended or adjusted under 35 U.S.C. 154(b) by 80 days.

(21) Appl. No.: 14/108,420

(22) Filed: Dec. 17, 2013

(65) Prior Publication Data

US 2014/0376990 A1  Dec. 25, 2014

(30) Foreign Application Priority Data

Jun. 24, 2013 (TW) .............................. 102211797 U

(51) Int. Cl.
*F16B 7/10* (2006.01)

(52) U.S. Cl.
CPC ......... F16B 7/105 (2013.01); *Y10T 403/32467* (2015.01); *Y10T 403/32483* (2015.01); *Y10T 403/32501* (2015.01)

(58) Field of Classification Search
CPC ............... Y10T 403/32467; Y10T 403/32475; Y10T 403/32483; Y10T 403/32501; Y10T 403/32508; Y10T 403/32516; Y10T 403/5793; Y10T 403/589; Y10T 403/68; Y10T 403/7051; Y10T 403/7064; Y10T 403/76
USPC ............. 403/109.1–109.3, 109.5–109.7, 314, 403/320, 343, 367, 374.1, 409.1
See application file for complete search history.

(56) References Cited

U.S. PATENT DOCUMENTS

| | | | | | |
|---|---|---|---|---|---|
| 1,365,829 | A | * | 1/1921 | Hurd | 292/275 |
| 2,291,747 | A | * | 8/1942 | Neuwirth | 248/188.5 |
| 2,649,104 | A | * | 8/1953 | Militano | 135/74 |
| 4,238,164 | A | * | 12/1980 | Mazzolla | 403/109.5 |
| 4,385,849 | A | * | 5/1983 | Crain | 403/109.3 |
| 5,464,299 | A | * | 11/1995 | Scharer et al. | 403/297 |
| 6,250,838 | B1 | * | 6/2001 | Dann | 403/109.5 |
| 7,802,768 | B2 | * | 9/2010 | Carnevali | 248/412 |
| 7,815,391 | B2 | * | 10/2010 | Kauppila | 403/367 |
| 8,114,077 | B2 | * | 2/2012 | Steiner et al. | 606/59 |
| 8,485,751 | B2 | * | 7/2013 | Vetesnik | 403/109.3 |
| 2006/0193679 | A1 | * | 8/2006 | Lin | 403/109.5 |
| 2012/0207534 | A1 | * | 8/2012 | Tran | 403/109.1 |

* cited by examiner

*Primary Examiner* — Daniel P Stodola
*Assistant Examiner* — Nahid Amiri
(74) *Attorney, Agent, or Firm* — Akerman LLP; Peter A. Chiabotti

(57) ABSTRACT

A collapsible tubular rod includes a tubular rod body which has first and second rod segments and which is convertible between collapsed and assembled states, a socket body fixed in the first rod segment, a plug member configured to be brought into rotatable engagement with the socket body, a guiding sleeve sleeved on the plug member, and a spring-loaded pin received in the plug member so as to extend outwardly of the guiding sleeve, and a connecting cord. When the tubular rod body is in the assembled state, the plug member and the guiding sleeve are guided by the socket body to permit the spring-loaded pin to extend outwardly of an outer surface of the first rod segment.

8 Claims, 5 Drawing Sheets

COLLAPSIBLE TUBULAR ROD

CROSS-REFERENCE TO RELATED APPLICATION

This application claims priority of Taiwanese application no. 102211797, filed on Jun. 24, 2013.

BACKGROUND OF THE INVENTION

1. Field of the Invention

This invention relates to a collapsible tubular rod, more particularly to a collapsible tubular rod capable of being recovered into an in-line arrangement.

2. Description of the Related Art

Referring to FIG. 1, a conventional telescopic rod includes large-diameter and small-diameter rod segments 7, 8 which extend along a lengthwise axis (I) and which is convertible from a collapsed position (not shown) to a fixed extended position (FIG. 1) by virtue of a spring-biased means. The spring-biased means includes a hairpin spring 9 mounted in the small-diameter rod segment 8 and a button 91 urged by the hairpin spring 9 to extend outwardly of a through hole 81 in the small-diameter rod segment 8. In the fixed extended position, a retaining hole 71 in the large-diameter rod segment 7 is in register with the through hole 81 to permit the button 91 to extend outwardly of the retaining hole 71. When the telescopic rod is converted to the collapsed position, the button 91 is pressed to permit the smaller-diameter rod segment 8 to be retained in the large-diameter rod segment 7 at a position by virtue of a frictional engagement between the button 91 and an inner surface of the large-diameter rod segment 7.

However, in the collapsed position, the large-diameter and small-diameter rod segments 7, 8 can rotate relative to each other. As such, when the telescopic rod is converted from the collapsed position to the fixed extended position, a manual alignment of the through hole 81 and the retaining hole 71 may be necessary. Furthermore, the small-diameter rod segment 8 may be separated from the large-diameter rod segment 7 due to undue pulling of the small-diameter rod segment 8.

SUMMARY OF THE INVENTION

Therefore, an object of the present invention is to provide a collapsible tubular rod which can be assembled in a more efficient way.

Accordingly, a collapsible tubular rod of this present invention is capable of being recovered into an in-line arrangement and includes:

a tubular rod body including a first rod segment which extends lengthwise along a lengthwise axis to terminate at front and rear rod ends, and a second rod segment which extends lengthwise to terminate at a proximate rod end that is proximate to the rear rod end, the first and second rod segments being configured to be end-to-end engageable such that the tubular rod body is convertible between a collapsed state in which the first and second rod segments are separated from each other, and an assembled state in which the rear rod end is engaged with the proximate rod end to permit the tubular rod body to be of the in-line arrangement, the first rod segment having inner and outer surfaces and a retaining hole that extends from the inner surface to the outer surface and that is disposed between the front and rear rod ends;

a socket body which is insertably fitted in the first rod segment so as to be set in a predetermined position between the retaining hole and the front rod end, and which has a leading segment and a trailing cam segment that extends from the leading segment to terminate at a fixed trailing end region and that has a fixed cam surface extending from the fixed trailing end region toward the leading segment in circumferential and axial directions to terminate at a fixed terminal end region;

a plug member which is slidably fitted in the rear rod end, and which includes a plug head that is configured to be brought into rotatable engagement with the socket body, and a plug end that is opposite to the plug head in a direction of the lengthwise axis, and that is formed with a receiving hole extending radially;

a spring-loaded pin which is disposed in the receiving hole and which includes a spring and a pin body that is urged by a biasing force of the spring to extend outwardly of the receiving hole;

a guiding sleeve sleeved on the plug member, and having a sleeve segment and a guided cam segment which extends forwardly from the sleeve segment to terminate at a movable leading end region, and which has a movable cam surface extending from the movable leading end region toward the sleeve segment in the circumferential and axial directions to terminate at a movable terminal end region, the sleeve segment being formed with a through hole which is in register with the receiving hole to permit the spring-loaded pin to extend outwardly of the through hole to thereby permit the plug member to rotate with the guiding sleeve, the spring-loaded pin being configured to be in frictional engagement with the inner surface by a friction force and being slidable among a normal position where the friction force counteracts the biasing force, an interaction zone where the guiding sleeve and the plug member rotate relative to the socket body by virtue of a camming action between the movable cam surface and the fixed cam surface for subsequent alignment of the spring-loaded pin with the retaining hole, and a dead end position where the movable leading end region is fully mated with the fixed terminal end region to permit the spring-loaded pin to be in register with the retaining hole and to be snapped into the retaining hole to thereby lock the first and second rod segments in the assembled state; and a connecting cord including a first cord segment which connects the socket body with the plug head, and a second cord segment which connects the plug end to the proximate rod end such that when the tubular rod body is in the assembled state, the connecting cord is in a tensioned state.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 1:
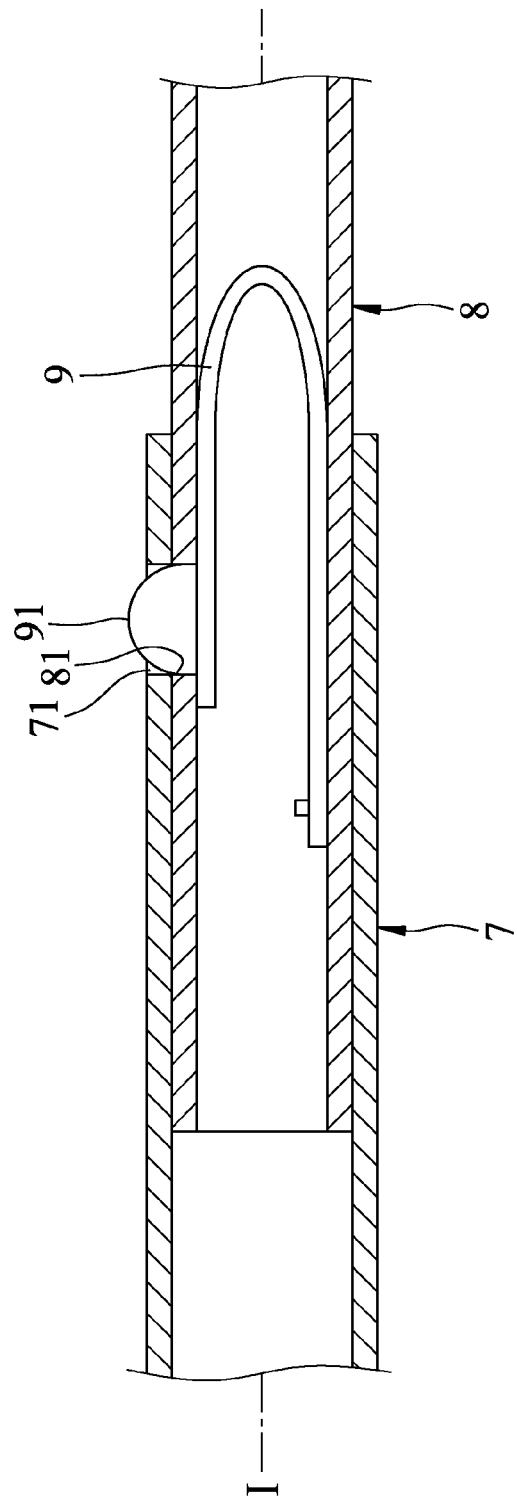
FIG. 1 is a cross-sectional view of a conventional telescopic rod.
Figure 2:
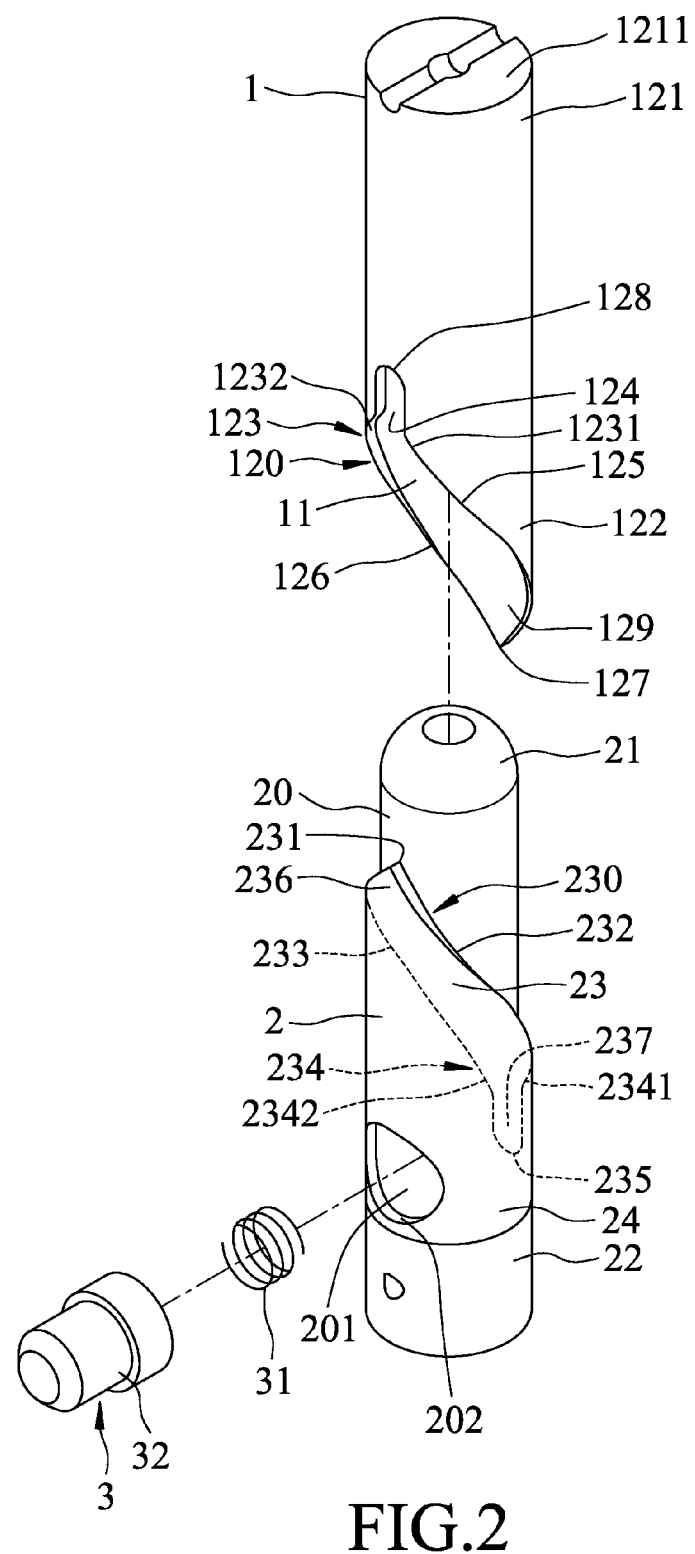
FIG. 2 is an exploded view of a positioning means of a collapsible tubular rod according to a preferred embodiment of this invention.
Figure 3:
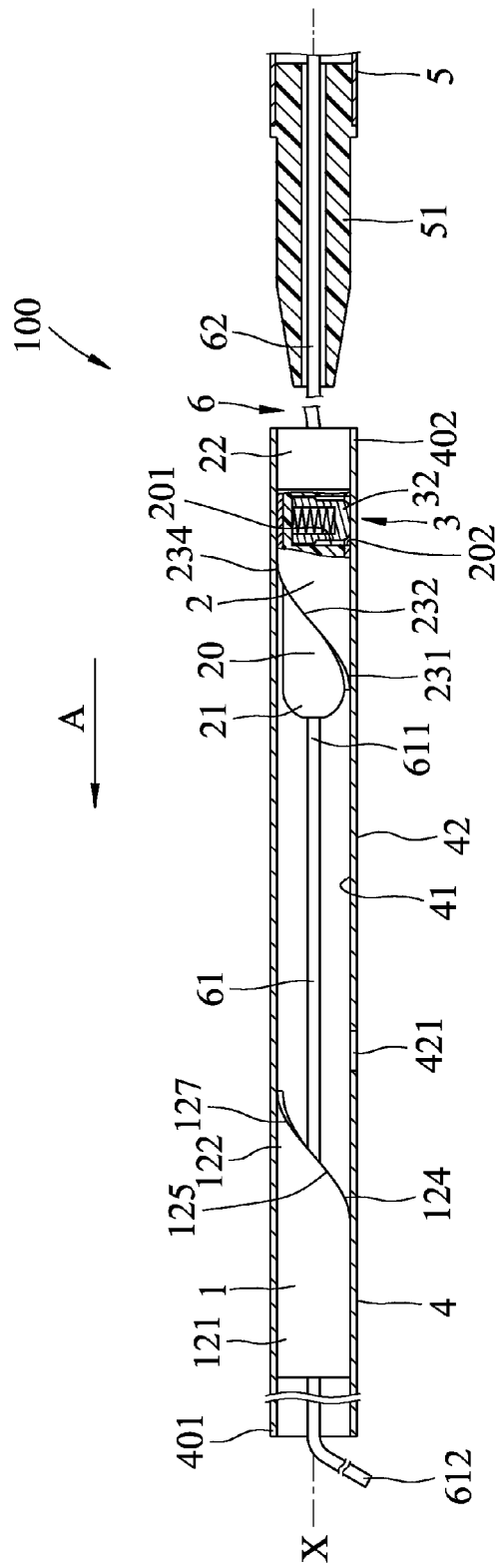
FIG. 3 is a fragmentary cross-sectional view of the collapsible tubular rod in which a spring-loaded pin is in a normal position.

Referring to FIGS. 2 and 3, a collapsible tubular rod according to the preferred embodiment of this invention includes a tubular rod body 100, a positioning means, and a connecting cord 6.

The tubular rod body 100 includes first and second rod segments 4, 5. The first rod segment 4 extends lengthwise along a lengthwise axis (X) to terminate at front and rear rod ends 401, 402. The second rod segment 5 extends lengthwise to terminate at a proximate rod end 51 that is proximate to the rear rod end 402. The first and second rod segments 4, 5 are configured to be end-to-end engageable such that the tubular rod body 100 is convertible between a collapsed state in which the first and second rod segments 4, 5 are separated from each other, and an assembled state in which the rear rod end 402 is engaged with the proximate rod end 51 to permit the tubular rod body 100 to be of the in-line arrangement. The first rod segment 4 has inner and outer surfaces 41, 42 and a retaining hole 421 that extends from the inner surface 41 to the outer surface 42 and that is disposed between the front and rear rod ends 401, 402. In this embodiment, the first and second rod segments 4, 5 are of substantially the same outer diameter, and the proximate rod end 51 is tapered so as to be inserted into the first rod segment 4 to be engaged with the rear rod end 402.

The positioning means includes a socket body 1, a plug member 20, a guiding sleeve 2, and a spring-loaded pin 3.

The socket body 1 is insertably fitted in the first rod segment 4 so as to be set in a predetermined position between the retaining hole 421 and the front rod end 401. In this embodiment, the socket body 1 is fixed on the inner surface 41 at the predetermined position. The socket body 1 has a leading segment 121 and a trailing cam segment 122. The trailing cam segment 122 extends from the leading segment 121 to terminate at a fixed trailing end region 129, and has a fixed cam surface 120 which extends from the fixed trailing end region 129 toward the leading segment 121 in circumferential and axial directions to terminate at a fixed terminal end region 123.

The plug member 20 is slidably fitted in the rear rod end 402, and includes a plug head 21 and a plug end 22. The plug head 21 is configured to be brought into rotatable engagement with the socket body 1. The plug end 22 is opposite to the plug head 21 in a direction of the lengthwise axis (X), and is formed with a receiving hole 201 that extends radially.

The spring-loaded pin 3 is disposed in the receiving hole 201 and includes a spring 31 and a pin body 32 that is urged by a biasing force of the spring 31 to extend outwardly of the receiving hole 201.

Figure 4:
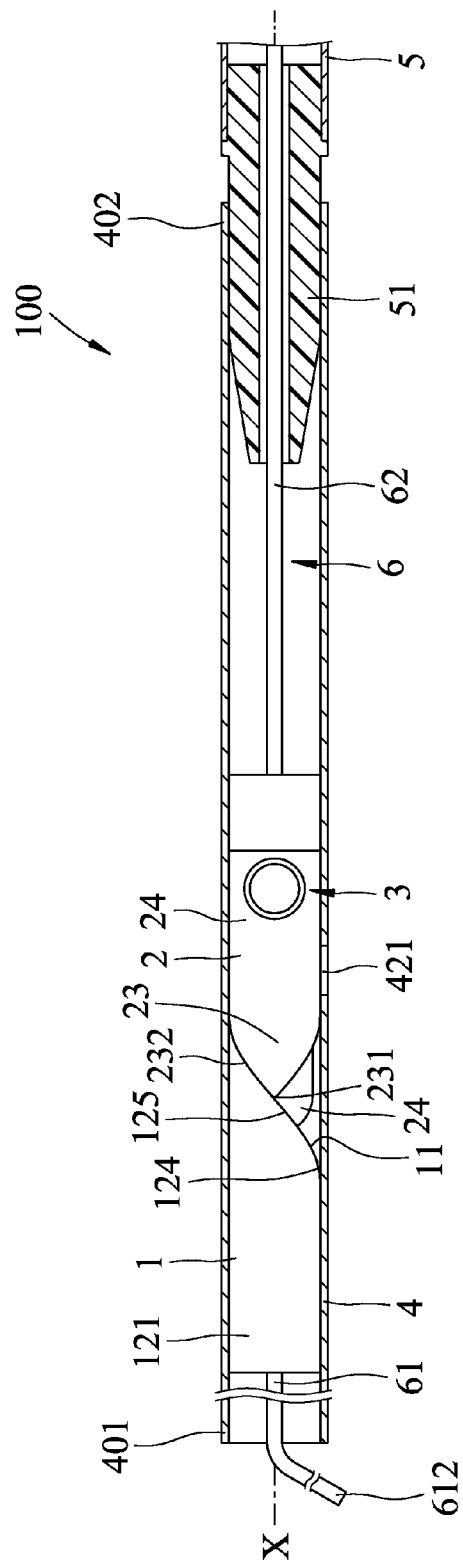
FIG. 4 is similar to FIG. 3, illustrating that the spring-loaded pin is in an interaction zone.
Figure 5:
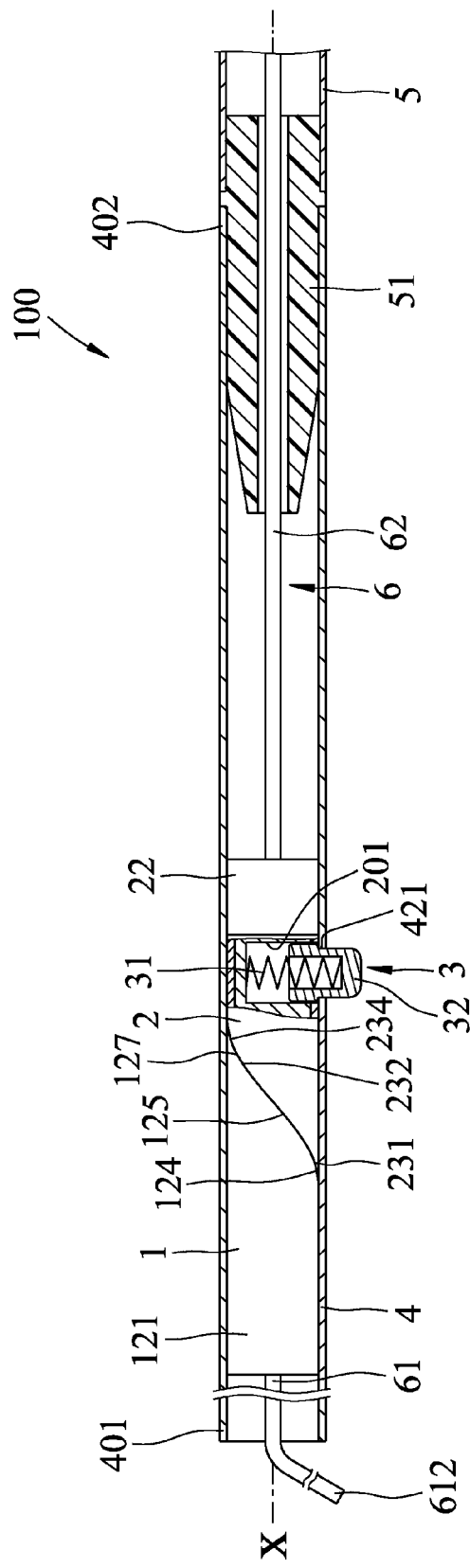
FIG. 5 is similar to FIG. 3, illustrating that the spring-loaded pin is in a dead end position.

The guiding sleeve 2 is sleeved on the plug member 20, and has a guided cam segment 23 and a sleeve segment 24. The guided cam segment 23 extends forwardly from the sleeve segment 24 to terminate at a movable leading end region 236, and has a movable cam surface 230 which extends from the movable leading end region 236 toward the sleeve segment 24 in the circumferential and axial directions to terminate at a movable terminal end region 234. The sleeve segment 24 is formed with a through hole 202 which is in register with the receiving hole 201 so as to permit the spring-loaded pin 3 to extend outwardly of the through hole 202 to thereby permit the plug member 20 to rotate with the guiding sleeve 2. The spring-loaded pin 3 is configured to be in frictional engagement with the inner surface 41 by a friction force, and is slidable among a normal position (FIG. 3) where the friction force counteracts the biasing force, an interaction zone (FIG. 4) where the guiding sleeve 2 and the plug member 20 rotate relative to the socket body 1 by virtue of a camming action between the movable cam surface 230 and the fixed cam surface 120 for subsequent alignment of the spring-loaded pin 3 with the retaining hole 421, and a dead end position (FIG. 5) where the movable leading end region 236 is fully mated with the fixed terminal end region 123 to permit the spring-loaded pin 3 to be in register with the retaining hole 421 and to be snapped into the retaining hole 421 to thereby lock the first and second rod segments 4, 5 in the assembled state.

Preferably, the leading segment 121 of the socket body 1 has a closed end 1211 opposite to the fixed terminal end region 123 in the direction of the lengthwise axis (X), and the socket body 1 defines a tubular cavity 11 extending from the fixed terminal end region 123 along the lengthwise axis (X) toward the front rod end 401 to terminate at the closed end 1211 so as to permit the plug head 21 to be inserted into the tubular cavity 11.

The connecting cord 6 includes a first cord segment 61 which connects the socket body 1 with the plug head 21, and a second cord segment 62 which connects the plug end 22 to the proximate rod end 51 such that when the tubular rod body 100 is in the assembled state, the connecting cord 6 is in a tensioned state.

Preferably, the first cord segment 61 is led through the tubular cavity 11 and a through hole in the closed end 1211 along the direction of the lengthwise axis (X), and has a fixed end 611 secured to the plug head 21, and a pulling end 612 that is disposed outwardly of the front rod end 401 such that, upon manual pulling of the pulling end 612, the connecting cord 6 is transformed from an untensioned state to the tensioned state so as to convert the tubular rod body 100 from the collapsed state to the assembled state. In detail, when the pulling end 612 is pulled, the fixed end 611 is also moved forwardly, thereby pulling the plug member 20, the guiding sleeve 2, the spring-loaded pin 3, and the proximate rod end 51 to move forwardly so as to permit the camming action between the movable cam surface 230 and the fixed cam surface 120.

In the preferred embodiment, the fixed terminal end region 123 has first and second fixed camming ends 1231, 1232, and the fixed cam surface 120 has first and second fixed cam regions 125, 126 which diverge from the fixed trailing end region 129 and converge toward the fixed terminal end region 123 to terminate respectively at the first and second fixed camming ends 1231, 1232.

The movable terminal end region 234 has first and second movable camming ends 2341, 2342, and the movable cam surface 230 has first and second movable cam regions 232, 233 which diverge from the movable leading end region 236 and converge toward the movable terminal end region 234 to respectively terminate at the first and second movable camming ends 2341, 2342. When the plug member 20 is moved toward the socket body 1, one of the first and second movable cam regions 232, 233 is guided by a corresponding one of the first and second fixed cam regions 125, 126 to permit the movable leading end region 236 to be fully mated with the first and second fixed camming ends 1231, 1232 of the fixed terminal end region 123, and to permit the fixed trailing end region 129 to be fully mated with the first and second movable camming ends 2341, 2342 of the movable terminal end region 234.

It should be noted that even if the plug member 20 and the guiding sleeve 2 rotate with respect to the socket body 1 in the collapsed state, when the tubular rod body (100) is converted to the assembled state, the spring-loaded pin 3 can be moved to the dead end position by the camming action between the movable cam surface 230 and the fixed cam surface 120.

Preferably, the leading segment 121 is formed with a fixed receiving notch 124 which extends axially from the first and second fixed camming ends 1231, 1232 and which is in spatial communication with the tubular cavity 11. The movable leading end region 236 has a movable tip end 231 which, in the dead end position, extends into the fixed receiving notch 124 and is axially spaced apart from a wall surface 128 defining the fixed receiving notch 124.

The sleeve segment 24 is further formed with a movable receiving notch 237 which extends axially from the first and second movable camming ends 2341, 2342. The fixed trailing end region 129 has a fixed tip end 127 which, in the dead end position, extends into the movable receiving notch 237 and is axially spaced apart from a wall surface 235 defining the movable receiving notch 237.

It should be noted that since, the movable tip end 231 and the fixed tip end 127 are axially and respectively spaced apart from the wall surfaces 128, 235 in the dead end position, they are less likely to wear to adversely affect the caming action.

Furthermore, although the tubular rod body 100 of this embodiment includes two rod segments (the first and second rod segments 4, 5, it can also include three or more rod segments which are engaged with one another by a plurality of the positioning means.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

What is claimed is:

1. A collapsible tubular rod capable of being recovered into an in-line arrangement, comprising:

a tubular rod body including a first rod segment which extends lengthwise along a lengthwise axis to terminate at front and rear rod ends, and a second rod segment which extends lengthwise to terminate at a proximate rod end that is proximate to said rear rod end, said first and second rod segments being configured to be end-to-end engageable such that said tubular rod body is convertible between a collapsed state in which said first and second rod segments are separated from each other, and an assembled state in which said rear rod end is engaged with said proximate rod end to permit said tubular rod body to be of the in-line arrangement, said first rod segment having inner and outer surfaces and a retaining hole that extends from said inner surface to said outer surface and that is disposed between said front and rear rod ends;

a socket body which is insertably fitted in said first rod segment so as to be set in a predetermined position between said retaining hole and said front rod end, and which has a leading segment and a trailing cam segment that extends from said leading segment to terminate at a fixed trailing end region and that has a fixed cam surface extending from said fixed trailing end region toward said leading segment in circumferential and axial directions to terminate at a fixed terminal end region;

a plug member which is slidably fitted in said rear rod end, and which includes a plug head that is configured to be brought into rotatable engagement with said socket body, and a plug end that is opposite to said plug head in a direction of the lengthwise axis, and that is formed with a receiving hole extending radially;

a spring-loaded pin which is disposed in said receiving hole and which includes a spring and a pin body that is urged by a biasing force of said spring to extend outwardly of said receiving hole;

a guiding sleeve sleeved on said plug member, and having a sleeve segment and a guided cam segment which extends forwardly from said sleeve segment to terminate at a movable leading end region, and which has a movable cam surface extending from said movable leading end region toward said sleeve segment in the circumferential and axial directions to terminate at a movable terminal end region, said sleeve segment being formed with a through hole which is in register with said receiving hole to permit said spring-loaded pin to extend outwardly of said through hole to thereby permit said plug member to rotate with said guiding sleeve, said spring-loaded pin being configured to be in frictional engagement with said inner surface by a friction force and being slidable among a normal position where said friction force counteracts the biasing force, an interaction zone where said guiding sleeve and said plug member rotate relative to said socket body by virtue of a camming action between said movable cam surface and said fixed cam surface for subsequent alignment of said spring-loaded pin with said retaining hole, and a dead end position where said movable leading end region is fully mated with the fixed terminal end region to permit said spring-loaded pin to be in register with said retaining hole and to be snapped into said retaining hole to thereby lock said first and second rod segments in the assembled state; and a connecting cord including a first cord segment which connects said socket body with said plug head, and a second cord segment which connects said plug end to said proximate rod end such that when said tubular rod body is in the assembled state, said connecting cord is in a tensioned state.

2. The collapsible tubular rod of claim 1, wherein said socket body defines a tubular cavity extending from said fixed terminal end region along the lengthwise axis toward said front rod end so as to permit said plug head to be inserted into said tubular cavity.

3. The collapsible tubular rod of claim 2, wherein said first cord segment is led through said tubular cavity along the direction of the lengthwise axis, and has a fixed end secured to the plug head, and a pulling end that is disposed outwardly of said front rod end such that, upon manual pulling of said pulling end, said connecting cord is transformed from an untensioned state to the tensioned state so as to convert said tubular rod body from the collapsed state to the assembled state.

4. The collapsible tubular rod of claim 2, wherein said fixed cam surface has first and second fixed cam regions which diverge from said fixed trailing end region and converge toward said fixed terminal end region, said movable cam surface having first and second movable cam regions which diverge from said movable leading end region and converge toward said movable terminal end region such that when said plug member is moved toward said socket body, one of said first and second movable cam regions is guided by a corresponding one of said first and second fixed cam regions so as to permit said movable leading end region to be fully mated with said fixed terminal end region.

5. The collapsible tubular rod of claim 4, wherein said fixed terminal end region has first and second fixed camming ends which are fully mated with said movable leading end region, and said first and second fixed cam regions extend from said fixed trailing end region to respectively terminate at said first and second fixed camming ends, said leading segment being formed with a fixed receiving notch which extends axially from said first and second fixed camming ends and which is in spatial communication with said tubular cavity, said movable leading end region having a movable tip end which, in the dead end position, extends into said fixed receiving notch and is axially spaced apart from a wall surface defining said fixed receiving notch.

6. The collapsible tubular rod of claim 4, wherein, in the dead end position, said movable terminal end region is fully mated with said fixed trailing end region.

7. The collapsible tubular rod of claim 6, wherein said movable terminal end region has first and second movable camming ends which are fully mated with said fixed trailing end region, and said first and second movable cam regions extend from said movable leading end region to respectively terminate at said first and second movable camming ends, said sleeve segment being formed with a movable receiving notch which extends axially from said first and second movable camming ends, said fixed trailing end region having a fixed tip end which, in the dead end position, extends into said movable receiving notch and is axially spaced apart from a wall surface defining said movable receiving notch.

8. The collapsible tubular rod of claim 1, wherein said socket body is fixed on said inner surface at the predetermined position.

\* \* \* \* \*